(12) United States Patent
Ogino

(10) Patent No.: US 12,326,698 B2
(45) Date of Patent: Jun. 10, 2025

(54) MACHINE LEARNING DEVICE, MACHINED STATE PREDICTION DEVICE, AND CONTROL DEVICE

(71) Applicant: FANUC CORPORATION, Yamanashi (JP)

(72) Inventor: Hideo Ogino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 363 days.

(21) Appl. No.: 17/792,339

(22) PCT Filed: Jan. 25, 2021

(86) PCT No.: PCT/JP2021/002485
§ 371 (c)(1),
(2) Date: Jul. 12, 2022

(87) PCT Pub. No.: WO2021/153514
PCT Pub. Date: Aug. 5, 2021

(65) Prior Publication Data
US 2023/0103837 A1    Apr. 6, 2023

(30) Foreign Application Priority Data
Jan. 31, 2020    (JP) ................................. 2020-015704

(51) Int. Cl.
*G05B 13/02* (2006.01)
*B24B 39/00* (2006.01)
*B24B 51/00* (2006.01)

(52) U.S. Cl.
CPC .......... *G05B 13/0265* (2013.01); *B24B 39/00* (2013.01); *B24B 51/00* (2013.01); *G05B 13/026* (2013.01)

(58) Field of Classification Search
CPC .............. G05B 13/0265; G05B 13/026; G05B 2219/32194; G05B 19/41875; B24B 39/00; B24B 51/00; B24B 49/12; B24B 39/04
See application file for complete search history.

(56) References Cited

U.S. PATENT DOCUMENTS

2018/0259946 A1* 9/2018 Kadokura ........ G05B 19/41875
2019/0240804 A1* 8/2019 Zhang .................... G06N 20/00
(Continued)

FOREIGN PATENT DOCUMENTS

CN    107797516    3/2018
CN    108573310    9/2018
(Continued)

OTHER PUBLICATIONS

P. Senthil Kumar, "Comparative Modeling on Surface Roughness for Roller Burnishing Process Using Fuzzy Logic", Dec. 22, 2017, International Journal of Mechanical and Production Engineering Research and Development, vol. 8, Issue 1 (Year: 2017).*
(Continued)

*Primary Examiner* — Christopher W Carter
(74) *Attorney, Agent, or Firm* — Wenderoth, Lind & Ponack, L.L.P.

(57) ABSTRACT

A machine learning device is provided with: an input data obtaining unit that, in burnishing process in which a processing surface of an arbitrary workpiece is surface-treated with an arbitrary tool, obtains as input data processing information including information of the workpiece prior to the burnishing process and information of a processing condition; a label obtaining unit that obtains label data indicating processed state information including a processed state of the workpiece after the burnishing process and surface roughness of the workpiece when the processed state is normal; and a learning unit that carries out supervised
(Continued)

learning using the input data and the label data thus obtained to generate a learned model to which processing information of an upcoming burnishing process is input and which outputs processed state information for the burnishing process.

10 Claims, 8 Drawing Sheets

(56) References Cited

U.S. PATENT DOCUMENTS

| | | | | |
|---|---|---|---|---|
| 2019/0291270 | A1* | 9/2019 | Kiyama | B25J 11/0065 |
| 2019/0299406 | A1* | 10/2019 | Kurokawa | B25J 13/006 |

FOREIGN PATENT DOCUMENTS

| | | |
|---|---|---|
| CN | 109426154 | 3/2019 |
| CN | 110116371 | 8/2019 |
| JP | H08-168956 A | 7/1996 |
| JP | 2006-26747 | 2/2006 |
| JP | 2012-71389 | 4/2012 |
| JP | 2012-74574 | 4/2012 |
| JP | 5527543 | 6/2014 |
| JP | 2018-106417 | 7/2018 |
| JP | 2019-38027 | 3/2019 |

OTHER PUBLICATIONS

Kiran A Patel, "A comparative study of the RSM and ANN models for predicting surface roughness in roller burnishing", 2016, Procedia Technology, 3rd International Conference on Innovations in Automation and Mechatronics Engineering (Year: 2016).*

GU Ji-nan, et al., "Expert System for Cylinder Grinding Control Based on Surface Roughness", Journal of Mechanical & Electrical Engineering, vol. 35, Issue 3, Mar. 2018, pp. 219-223, with English translation.

Li Jie, et al., "Optimization of Process Parameters in Abrasive Belt Polishing of Aeroengine Blade", Aviation Manufacturing Technology, Issue 8, Apr. 2016, pp. 60-65.

Li Jie, et. al., "Optimization of Process Parameters in Abrasive Belt Polishing of Aeroengine Blade", Aviation Manufacturing Technology, Issue 8, Apr. 2016, pp. 60-65, with machine translation.

International Search Report issued Apr. 6, 2021 in corresponding International Application No. PCT/JP2021/002485.

* cited by examiner

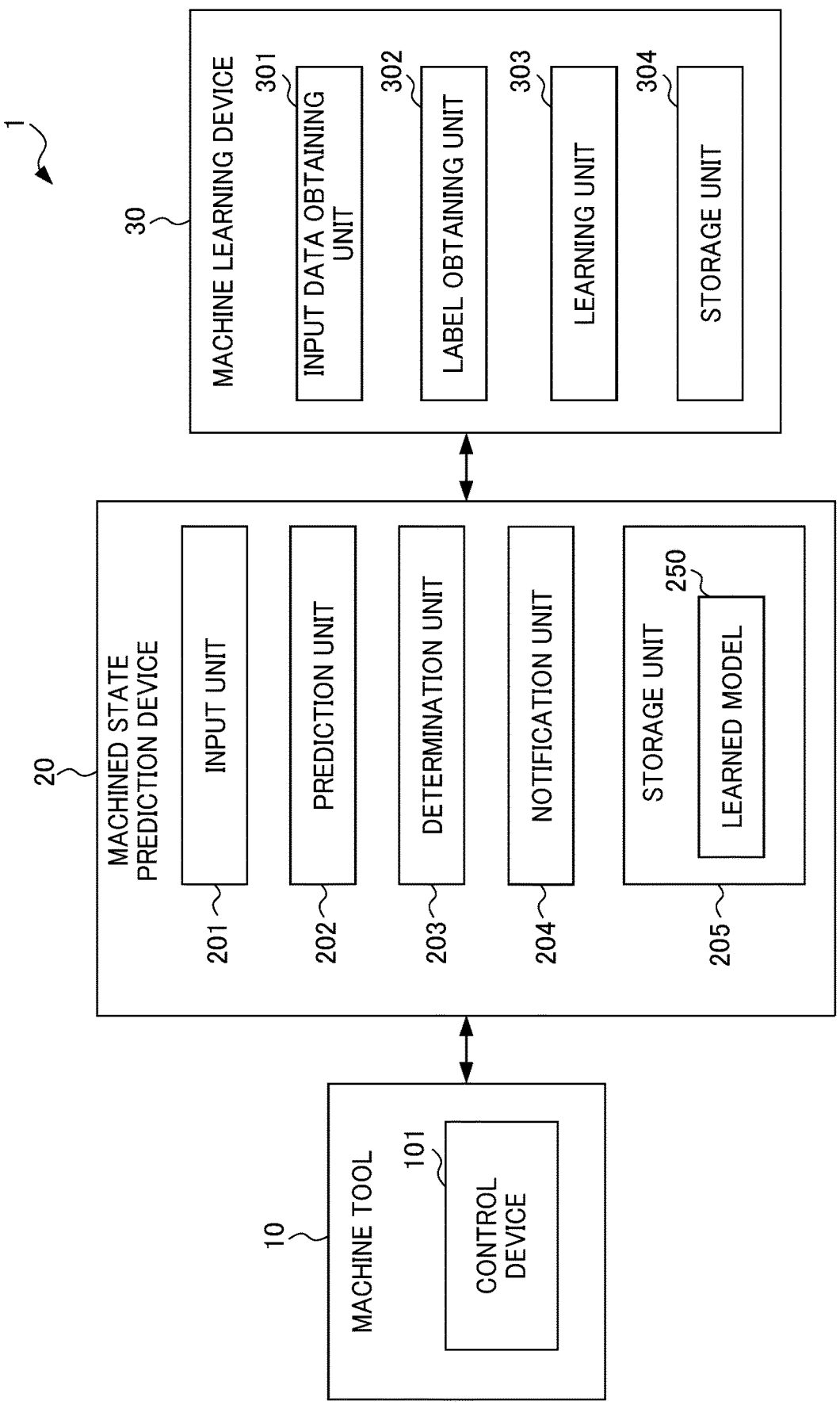

FIG. 2

| INFORMATION ON WORKPIECES | | | | INFORMATION ON MACHINING CONDITIONS FOR BURNISHING | | | LABEL DATA | |
|---|---|---|---|---|---|---|---|---|
| MATERIAL | BRINELL HARDNESS | THICKNESS | SURFACE ROUGHNESS BEFORE MACHINING | RELATIVE ROTATION NUMBER (PERIPHERAL SPEED) | RELATIVE FEEDRATE | AMOUNT OF ROLLING COMPACTION | MACHINED STATE | SURFACE ROUGHNESS AFTER MACHINING |
| S45C (CARBON STEEL) | HB200 | — (NOT HOLLOW) | Ra0.483 | 60m/min | 1.0mm/min | 0.02mm | NORMAL | Ra0.113 |
| SCM440 (CHROMIUM MOLYBDENUM STEEL) | HB350 | — (NOT HOLLOW) | Ra0.988 | 30m/min | 0.8mm/min | 0.02mm | NORMAL | Ra0.114 |
| SUS303 (CHROMIUM STAINLESS STEEL) | HB180 | — (NOT HOLLOW) | Ra0.349 | 70m/min | 1.5mm/min | 0.02mm | NORMAL | Ra0.083 |
| A5056 (ALUMINUM ALLOY) | HB80 | — (NOT HOLLOW) | Ra1.236 | 78m/min | 2.5mm/min | 0.03mm | NORMAL | Ra0.147 |
| AC3A (ALUMINUM ALLOY) | HB50 | 3mm (HOLLOW) | Ra1.127 | 70m/min | 2.5mm/min | 0.03mm | ABNORMAL | — |
| ‥ | ‥ | ‥ | ‥ | ‥ | ‥ | ‥ | ‥ | ‥ |

FIG. 3
| MATERIAL | SURFACE ROUGHNESS [μm] | |
| --- | --- | --- |
| | BEFORE MACHINING | AFTER MACHINING |
| S45C | 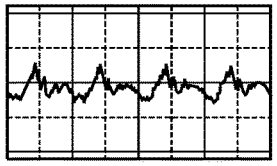 Ra0.483 | 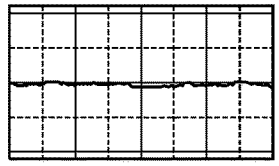 Ra0.113 |
| SCM440 | 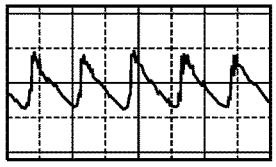 Ra0.988 |  Ra0.114 |
| SUS303 | 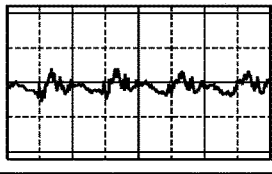 Ra0.349 | 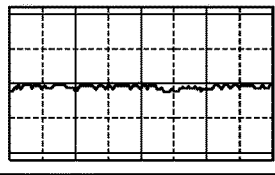 Ra0.083 |
| A5056 | 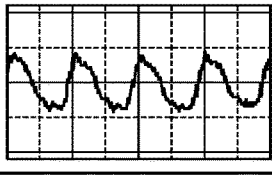 Ra1.236 | 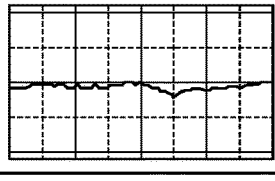 Ra0.147 |

MACHINE LEARNING DEVICE, MACHINED STATE PREDICTION DEVICE, AND CONTROL DEVICE

TECHNICAL FIELD

The present invention pertains to a machine learning device, a machined state prediction device, and a control device.

BACKGROUND ART

Burnishing is a means for finishing by which the surface roughness of a workpiece such as a machine component is made to be within a certain value after cutting.

As illustrated in FIG. 8 (corresponds to FIG. 1 in Patent Document 1 described below), burnishing a method of plastic working for smooth finishing a surface by pressing a tool T having a roller (or spherical) shape onto a surface to be burnished of a metal workpiece W while causing rolling compaction. As a result, the vicinity of a burnished portion of the workpiece W hardens and compressive residual stress is applied, whereby improvements to the abrasion resistance or fatigue strength of the burnished portion can be expected. Therefore, burnishing is mainly use in finishing of automobile components, etc.

Note that, in a region A in FIG. 8, pressure is gradually applied while the tool T is pressed onto a surface of the workplace W. In addition, in a region B, contact pressure exceeds the yield point of the workpiece W, and plastic deformation occurs. In addition, in a region C, the tool T separates from the burnished surface, and the metal of the workpiece W elastically recovers only a minute distance Dr. As a result, at the location the tool T went over, surface unevenness is flattened, and roughness is reduced.

Here, the distance Dr refers to an amount of elastic recovery. In addition, a distance Dv is the distance by which the tool T presses into the surface of the workpiece N, and also indicates an amount of rolling compaction (or an amount of burnishing). In addition, a distance Ds between the surface before burnishing was performed and the surface which has elastically recovered by the distance Dr after burnishing is also referred to as an amount of dimensional change.

A technique for creating a response surface indicating how an amount of rolling compaction and a surface roughness before machining relate to a surface roughness after machining, and determining, based on the created response surface, a roller rotation speed, feedrate, amount of rolling compaction, etc. for a burnishing tool is known. For example, refer to Patent Document 1.

Patent Document 1: Japanese Patent No. 5527543

DISCLOSURE OF THE INVENTION

Problems to be Solved by the Invention

In burnishing, machining conditions such as the amount of rolling compaction, the relative rotation speed (roller rotating speed) between a tool and a workpiece, and the relative feedrate between the tool and the workpiece must be appropriately adjusted in accordance with the dimensions or surface roughness or the material that are required after burnishing.

In the case of a hollow workpiece in particular, as illustrated in FIG. 9, waviness or deform may arise due to the amount of rolling compaction when the wall thickness of the workpiece is thin, and it is difficult to adjust the amount of rolling compaction that corresponds to the workpiece material (hardness) and the wall thickness. Therefore, machining conditions are often determined based on the experience of an expert.

Furthermore, plastic working is accompanied by elastic recovery (action to return to the original shape) and differences in amounts of elastic recovery arise due to the workpiece material, hardness and the machining conditions. Therefore, it is necessary to readjust machining conditions or perform burnishing again in the case where required dimensions or surface roughness could not be achieved. However, readjusting the machining conditions or performing burnishing again incurs time and effort.

Accordingly, there is a desire to create a learned model that outputs with good accuracy the machined state of a workpiece after burnishing in the case where burnishing has been performed under designated machining conditions and use the learned model to predict with good accuracy the machined state of a workpiece after burnishing, without actually carrying out or simulating burnishing.

Means for Solving the Problems (1) One aspect of a machine learning device according to the present disclosure is provided with an input data obtaining unit configured to obtain, as input data, machining information for burnishing in which surface treatment was performed by pressing an arbitrary tool against a machined surface of an arbitrary workpiece, the machining information including at least information on the workpiece before the burnishing and information on a machining condition for the burnishing; a label obtaining unit configured to obtain label data indicating machined state information including a machined state of the workpiece after the burnishing and a surface roughness of the workpiece in a case where the machined state is normal; and a learning unit configured to use the input data obtained by the input data obtaining unit and the label data obtained by the label obtaining unit to execute supervised learning and generate a learned model that takes as an input machining information regarding burnishing to be performed and outputs machined state information for the burnishing to be performed.

(2) One aspect of a machined state prediction device according to the present disclosure is provided with a learned model that is generated by the machine learning device according to (1) and is configured to be inputted with machining information regarding burnishing to be performed and output the machined state information for the burnishing to be performed; an input unit configured to be inputted with, before burnishing, machining information that includes information on a machining condition for the burnishing to be performed and information on a machining target workpiece; and a prediction unit configured to, by inputting to the learned model the machining information inputted to the input unit, predict the machined state information that is for the burnishing to be performed and is to be outputted by the learned model.

(3) One aspect of a control device according to the present disclosure is provided with a machined state prediction device according to (2).

Effects of the Invention

By virtue of one aspect, it is possible to generate a learned model which outputs with good accuracy the machined state of a workpiece after burnishing in a case where burnishing under designated machining conditions is performed, without actually carrying out or simulating burnishing. Furthermore, by using this learned model, it is possible to predict with good accuracy the machined state of a workpiece after burnishing.

BRIEF DESCRIPTION OF THE DRAWINGS

FIG. 1 is a functional block diagram illustrating an example of a functional configuration of a prediction system according to one embodiment;

FIG. 2 is a view that illustrates an example of information on workpieces, information on machining conditions for burnishing, and label data;

FIG. 3 is a view that illustrates, for respective workpieces illustrated in FIG. 2, an example of surface roughness before machining and surface roughness after machining;

PREFERRED MODE FOR CARRYING OUT THE INVENTION

Figure 4:
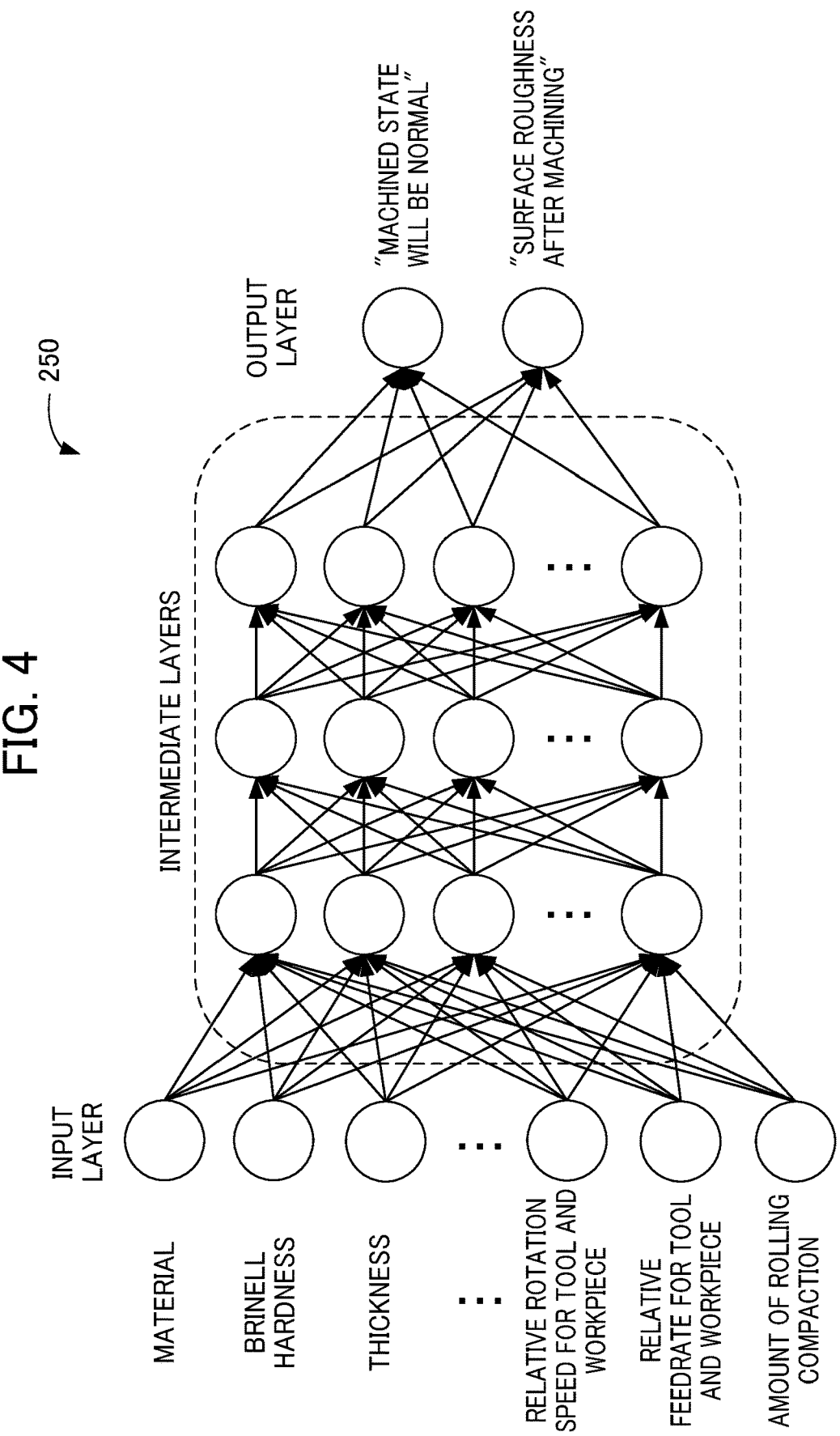
FIG. 4 is a view that illustrates an example of a learned model provided to the machined state prediction device in FIG. 1.

Description is given below regarding one embodiment according to the present disclosure, with reference to the drawings.

One Embodiment

FIG. 1 is a functional block diagram illustrating an example of a functional configuration of prediction system according to one embodiment. As illustrated in FIG. 1, a prediction system 1 has a machine tool 10, a machined state prediction device 20, and a machine learning device 30.

The machine tool 10, the machined state prediction device 20, and the machine learning device 30 may be directly connected to each other via a connection interface (not shown). The machine tool 10, the machined state prediction device 20, and the machine learning device 30 may also be mutually connected via a network (not shown) such as a local area network (LAN) or the internet. In this case, the machine tool 10, the machined state prediction device 20, and the machine learning device 30 are each provided with a communication unit not shown) for mutually communicating via the corresponding connection. Note that, as described below, the machined state prediction device 20 may include the machine learning device 30. In addition, the machine tool 10 may include the machined state prediction device 20 and the machine learning device 30.

The machine tool 10 is a machine tool that is publicly known to a person skilled in the art, and incorporates a control device 101. The machine tool 10 operates based on an operation command from the control device 101. As described below, before burnishing, the machine tool 10 may, via a communication unit (not shown) in the machine tool 10, output to the machined state prediction device 20 machining information that includes information on machining conditions for burnishing to be performed and information on a machining target workpiece.

Figure 8:
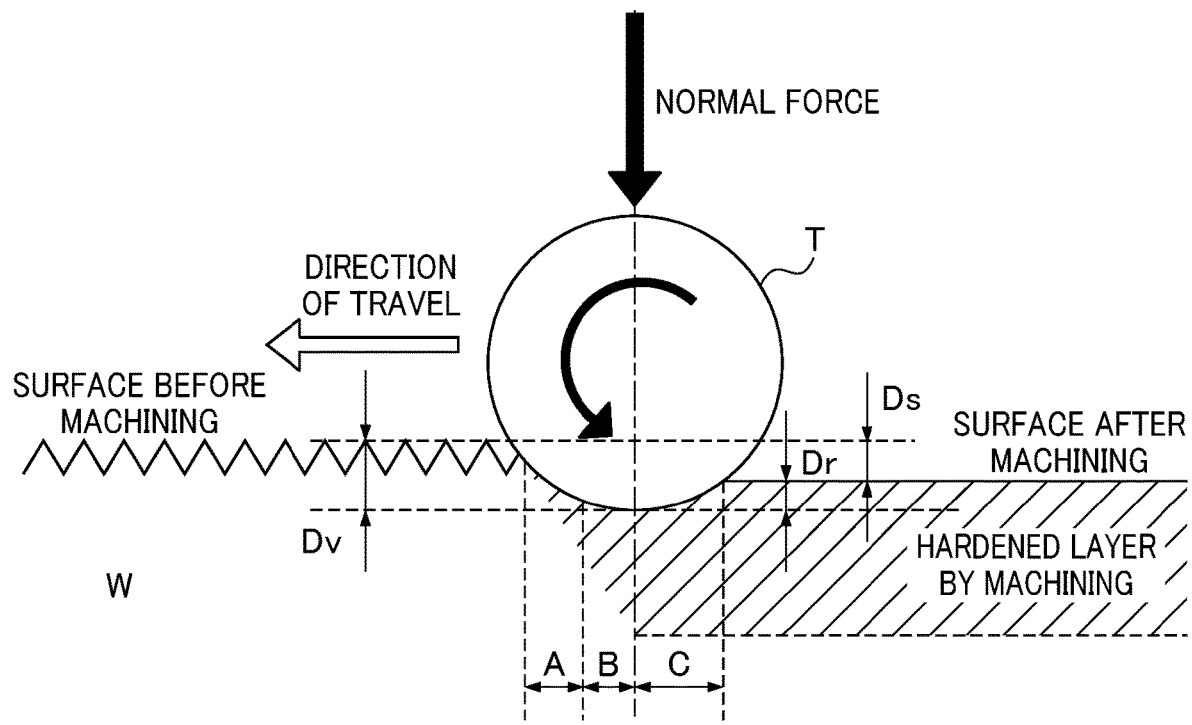
FIG. 8 is a schematic view for describing the principles of burnishing.

Note that the information on machining conditions for burnishing may include a relative rotation speed for a tool T and a workpiece W, a relative feedrate for the tool T and the workpiece W, an amount of rolling compaction Dv, etc., as illustrated in FIG. 8. In addition, the information on the machining target workpiece N may include the material, the hardness, the thickness, the surface roughness before machining, etc. relating to the workpiece W. However, it may be that the information on the machining target workpiece N includes the thickness (wall thickness) of the workpiece W only in the case where the workpiece W is hollow.

The control device 101 is a numerical control device that is publicly known to a person skilled in the art, and generates an operation command based on a program for burnishing, and transmits the generated operation command to the machine tool 10. As a result, the control device 101 can cause the machine tool 10 to perform burnishing. Note that, in place of the machine tool 10, the control device 101 may, via the communication unit (not shown) in the machine tool 10, output to the machined state prediction device 20 machining information that includes information on machining conditions for burnishing to be performed and information on a machining target workpiece.

In addition, the control device 101 may be independent from the machine tool 10.

In an operation phase and before burnishing, the machined state prediction device 20 obtains machining information that includes information on machining conditions for burnishing to be performed and information on a machining target workpiece. The machined state prediction device 20 inputs the obtained machining information regarding the burnishing to be performed to a learned model provided from the machine learning device 30 which is described below. As a result, the machined state prediction device 20 can predict machined state information for the burnishing to be performed.

Note that, for a machining target workpiece after the burnishing to be performed, the machined state information includes whether the machined state is normal, indicating no waviness and no deformation, and the surface roughness after machining in the case where the machined state is normal.

Before describing the machined state prediction device 20, description is given regarding machine learning for generating the learned model.

<Machine Learning Device 30>

For example, for burnishing in which surface treatment was performed in advance by pressing an arbitrary tool against a surface to be burnished or an arbitrary workpiece, the machine learning device 30 obtains, as input data, machining information which includes information on the workpiece before the burnishing and information on a machining condition for the burnishing.

For the obtained input data, the machine learning device 30 also obtains, as a label (correct answer), data indicating machined state information including the machined state of the workpiece after the burnishing and the surface roughness of the workpiece in the case where the machined state is normal.

The machine learning device 30 constructs a learned model, which is described below by performing supervised learning using training data which is a group of obtained input data and labels.

As a result, the machine learning device 30 can provide the constructed learned model the machined state prediction device 20.

The machine learning device 30 will be described in detail.

As illustrated in FIG. 1, the machine learning device 30 has an input data obtaining unit 301, a label obtaining unit 302, a learning unit 303, and a storage unit 304.

For burnishing in which surface treatment was performed by pressing an arbitrary tool against a surface to be burnished of an arbitrary workpiece, in a learning phase, the input data obtaining unit 301 obtains from the machine tool 10 via a communication unit (not shown) machining information, as input data. The machining information includes information on the workpiece before the burnishing and information on a machining condition for the burnishing.

FIG. 2 is a view that illustrates an example of information on workpieces, information on machining conditions for burnishing, and label data.

As illustrated in FIG. 2, information that pertains to workpieces and is included in machining information includes the "material", "Brinell hardness", "thickness", and "surface roughness before machining" of workpieces.

The "material" included in the information on workpieces includes "C15C", "S50C", "S55C", "S60C", etc. in addition to "S45C" in the case of carbon steel. In addition, the "material" included in the information on workpieces include "FC100", "FC150", "FC200", "FC250", "FC300", "FC350", etc. in the case of cast iron. In addition, the "material" included in the workpiece information includes "A4032", "A5052", "A5083", "A6061", "A7075", etc. in addition to "A5056" and "AC3A" in the case of an aluminum alloy addition, the "material" included in workpiece information includes "AZ31", "AZ91", etc. in the case of a magnesium alloy.

"Brinell hardness" is set as the "hardness" included in the information on workpieces. Note that "Vickers hardness", etc. may be set as the "hardness" included in the information on workpieces.

The "thickness" included in the information on workpieces is only set in the case where a workpiece is hollow, as described above. Accordingly, "-" indicating an empty field is stored for the "thickness" of workpieces for which the "material" is "S45C (carbon steel)", "SCM440 (chromium molybdenum steel)", "SUS303 (chromium stainless steel)", and "A5056 (aluminum alloy)" because these workpieces are not hollow.

The "surface roughness before machining" included in the information on workpieces is, for example, set to a value for arithmetic mean roughness (Ra), which is measured in advance before burnishing using, for example, a surface roughness measuring device that uses a stylus, laser light, etc. However, the "surface roughness before machining" may e set to a value for maximum height (Ry) or ten-point mean roughness (Rz).

Note that arithmetic mean roughness (Ra), maximum height (Ry), and ten-point mean roughness (Rz) can be calculated using a publicly-known method (for example, refer to JIS B 0601:1994, JIS B 0031:1994, etc.), and detailed description thereof is omitted.

Next, the information on machining conditions for burnishing includes "relative rotation speed (peripheral speed)", "relative feedrate", and "amount of rolling compaction" in the burnishing for each workpiece for which the information on workpieces described above is indicated, as illustrated in FIG. 2. Note that the "relative rotation speed (peripheral speed)", for example indicates the relative rotation speed for a tool T and a workpiece W, as illustrated in FIG. 8. In addition, the "relative feedrate" indicates the relative feedrate for the tool T and the workpiece W. In addition, the "amount of rolling compaction" indicates a distance Dv.

The input data obtaining unit 301 stores obtained input data in the storage unit 304.

For each item of input data, the lapel obtaining unit 302 obtains, as label data (correct answer data), machined state information including the machined state of the workpiece after the burnishing and the surface roughness of the workpiece in the case where the machined state is normal. The label obtaining unit 302 stores obtained label data in the storage unit 304.

Specifically, for example as indicated in FIG. 2, the label obtaining unit 302 obtains, as label data, a "machined state" set to "normal" in the case where there is no waviness, deformation, etc. and set to "abnormal" in a case where there is waviness, deformation, etc., for a workpiece after the burnishing. In addition, for example, the label obtaining unit 302 uses, for example, a surface roughness measuring device that uses a stylus, laser light, etc. to obtain, as label data, "surface roughness after machining" which is measured for a workpiece for which the "machined state" is normal, similarly to the case of "surface roughness before machining".

Note that the "machined state" in the label data in FIG. 2 is, for example, a result of an operator visually determining the state of the workpiece after the burnishing and may be inputted by the operator. In addition, the "surface roughness after machining" in the label data is, for example, surface roughness of the workpiece measured by an operator using, for example, a surface roughness measuring device after the burnishing, and may be inputted by the operator. Alternatively, the "machined state" and the "surface roughness after machining" in label data may be, for example, the state of the workpiece determined by image processing on an image of the workpiece captured after burnishing, and a measured surface roughness.

In addition, there is no limitation to label data including whether a "machined state" is normal or not, and may be represented by a binary value such as "1" and "0".

Figure 9:
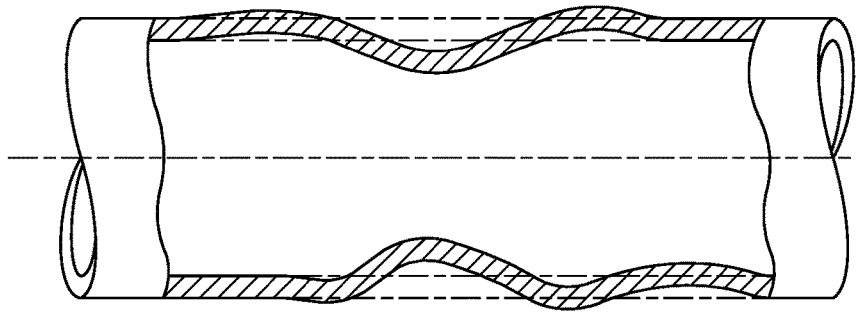
FIG. 9 is a view at illustrates an example of deformation due to an excessive amount of rolling compaction in the case of a hollow workpiece.

In addition, the workpiece in FIG. 2 for which the "material" is "AC3A (aluminum alloy)" is hollow, and because waviness, deformation, etc. due to the burnishing has occurred as illustrated in FIG. 9, the "machined state" is determined to be "abnormal", and "-" indicating an empty field is stored for the "surface roughness after machining".

FIG. 3 is a view that illustrates, for respective workpieces illustrated in FIG. 2, an example of surface roughness before machining and surface roughness after machining.

Here, "surface roughness after machining" is set to a value for arithmetic mean roughness (Ra), but may be set to a value for maximum height (Ry) or ten-point mean roughness (Rz).

The learning unit 303 accepts, as training data, a group of input data and a label which are described above. The learning unit 303 uses the accepted training data to perform supervised learning to thereby construct a learned model 250 that is inputted with machining information including information indicating machining conditions for burnishing to be performed and information on a machining target workpiece, and outputs machined state information indicating a machined state for the machining target workpiece after the burnishing to be performed.

The learning unit 303 provides the constructed learned model 250 to the machined state prediction device 20.

Note at it is desirable to prepare a large number of items of training data in order to perform the supervised learning. For example, training data may be obtained from machine tools 10 at various locations where the machine tools 10 are actual operated, such as factories belonging to customers.

FIG. 4 is a view that illustrates an example of a learned model 250 provided to the machined state prediction device 20 in FIG. 1. As illustrated in FIG. 4, the learned model 250 exemplifies a multi-layer neural network that sets information on a machining target workpiece and information on machining conditions for burnishing to be performed as an input layer, and sets machined state information indicating the machined state of the machining target workpiece after the burnishing to be performed as an output layer.

The information on a machining target workpiece includes the "material", "Brinell hardness", "thickness", and "surface roughness before machining" of the workpiece. In addition, the information on machining conditions for the burnishing to be performed includes the relative rotation speed for a tool and a workpiece, the relative feedrate for the tool and the workpiece, and an amount of rolling compaction. In addition, the machined state information includes whether the "machined state will be normal" for the machining target workpiece and the "surface roughness after machining" for the machining target workpiece.

In addition, in a case of newly obtaining training data after constructing the learned model 250, the learning unit 303 may further perform supervised learning with respect to the learned model 250 to thereby update the constructed learned model 250.

As a result, it is possible to automatically acquire training data from a burnishing operation by a usual machine tool 10, and thus it is possible to improve the accuracy of predicting the machined state of workpieces on a daily basis.

The supervised learning described above may be performed online learning, may be performed by batch learning, or may be performed by mini-batch learning.

Online learning is a learning method in which burnishing is performed at the machine tool 10, and supervised learning is immediately performed each time training data is created. In addition, batch learning is a learning method in which burnishing is repeatedly performed at the machine tool 10 and training data is repeatedly created, a plurality of items of training data corresponding to the repetitions are collected, and all of the collected training data is used to perform supervised learning. Furthermore, mini-batch learning is a learning method which is intermediate between online learning and batch learning and in which supervised learning is performed whenever a certain amount of training data is collected.

The storage unit 304 is, for example, a random-access memory (RAM), and stores, for example, input data obtained by the input data obtaining unit 301, label data obtained by the label obtaining unit 302, the learned model 250 constructed by the learning unit 303, etc.

This concludes description of machine learning for generating the learned model 250 that the machined state prediction device 20 is provided with.

Next, description is given regarding the machined state prediction device 20 in an operation phase.

<Machined State Prediction Device 20 in Operation Phase>

As illustrated in FIG. 1, the machined state prediction device 20 in the operation phase is configured by including an input unit 201, a prediction unit 202, a determination unit 203, a notification unit 204, and a storage unit 205.

Note that the machined state prediction device 20 is provided with an arithmetic processing device (not shown) such as a central processing unit (CPU) for realizing operation of the functional blocks in FIG. 1. In addition, the machined state prediction device 20 is provided with an auxiliary storage device (not shown) such as a read-only memory (RPM) or a hard disk drive (HDD) that stores various control programs, and a main storage device (not shown) such as a RAM that stores data temporarily required for the arithmetic processing device to execute a program.

In the machined state prediction device 20, the arithmetic processing device reads an OS or application software from the auxiliary storage apparatus, and while deploying the read OS or application software to the main storage device, performs arithmetic processing based on the OS or application software. Based on a result of the arithmetic processing, the machined state prediction device 20 controls each item of hardware. As a result, processing according to the functional blocks in FIG. 1 is realized. In other words, the machined state prediction device 20 can realize this processing by collaboration between hardware and software.

Before burnishing, the input unit 201 accepts as inputs, from the machine tool 10, machining information that includes information on machining conditions for burnishing to be performed and information on a machining target workpiece. The input unit 201 outputs the inputted machining information to the prediction unit 202.

Note that the information on machining conditions for the burnishing to be performed may include the relative rotation speed for a tool and a workpiece, the relative feedrate for the tool and the workpiece, and an amount of rolling compaction. In addition, the information on a machining target workpiece may include material, hardness, thickness (in the case of a hollow workpiece), and surface roughness before machining.

The prediction unit 202 inputs, to the learned model 250 in FIG. 3, the information on machining conditions for the burnishing to be performed and the information on the machining target workpiece, which are include in the machining information inputted by the input unit 201. As a result, the prediction unit 202 can predict from outputs from the learned model 250 whether, due to the burnishing to be performed, the "machined state will be normal" for the machining target workpiece and the "surface roughness after machining" in the case where the "machined state will be normal".

The determination unit 203 determines whether "machined state will be normal" is predicted by the prediction unit 202.

In the case where "machined state will be normal" is predicted by the prediction unit 202, the determination unit 203 compares the "surface roughness after machining" with a pre-set required accuracy α, and determines whether the "surface roughness after machining" is within the required accuracy α. In the case where the "surface roughness after machining" is within the required accuracy α, the determination unit 203 determines to cause the machine tool 10 to execute burnishing on the workpiece based on the inputted machining information.

In contrast, if it is not the case that the "machined state will be normal" (in other words, the machined state will be abnormal) or in the case where the "surface roughness after machining" will not be within the required accuracy α, the determination unit 203 determines to change the machining information regarding the burnishing to be performed.

As a result, the machined state prediction device 20 can prompt an operator of the machine tool 10 to revise the machining conditions for the burnishing to be performed, such that the "machined state will be normal" and the "surface roughness after machining" will be within the required accuracy α.

Note that the required accuracy α may be appropriately set in accordance with, for example, a cycle time or accuracy of burnishing required of the machine tool 10.

When the notification unit 204 receives from the determination unit 203 a determination to cause the machine tool 10 to execute burnishing based on inputted machining information, the notification unit 204 may output an instruction to execute burnishing based on the inputted machining information to an output device (not shown) such as a liquid-crystal display included in the machine tool 10 and/or the control device 101, for example.

In contrast, in the case where a determination to change the machining information is received from the determination unit 203, the notification unit 204 may output an instruction to change the machining conditions for the burnishing to be performed to the output device (not shown) in the machine tool 10 and/or the control device 101.

Note that the notification unit 204 may make a notification using sound via a speaker (not shown).

It may be that the storage unit 205 is a ROM, an HDD, etc., and stores various control programs as well as the learned model 250 and the required accuracy α.

<Prediction Processing by Machined State Prediction Device 20 in Operation Phase>

Next, description is given regarding operation for prediction processing by the machined state prediction device 20 according to the present embodiment.

Figure 5:
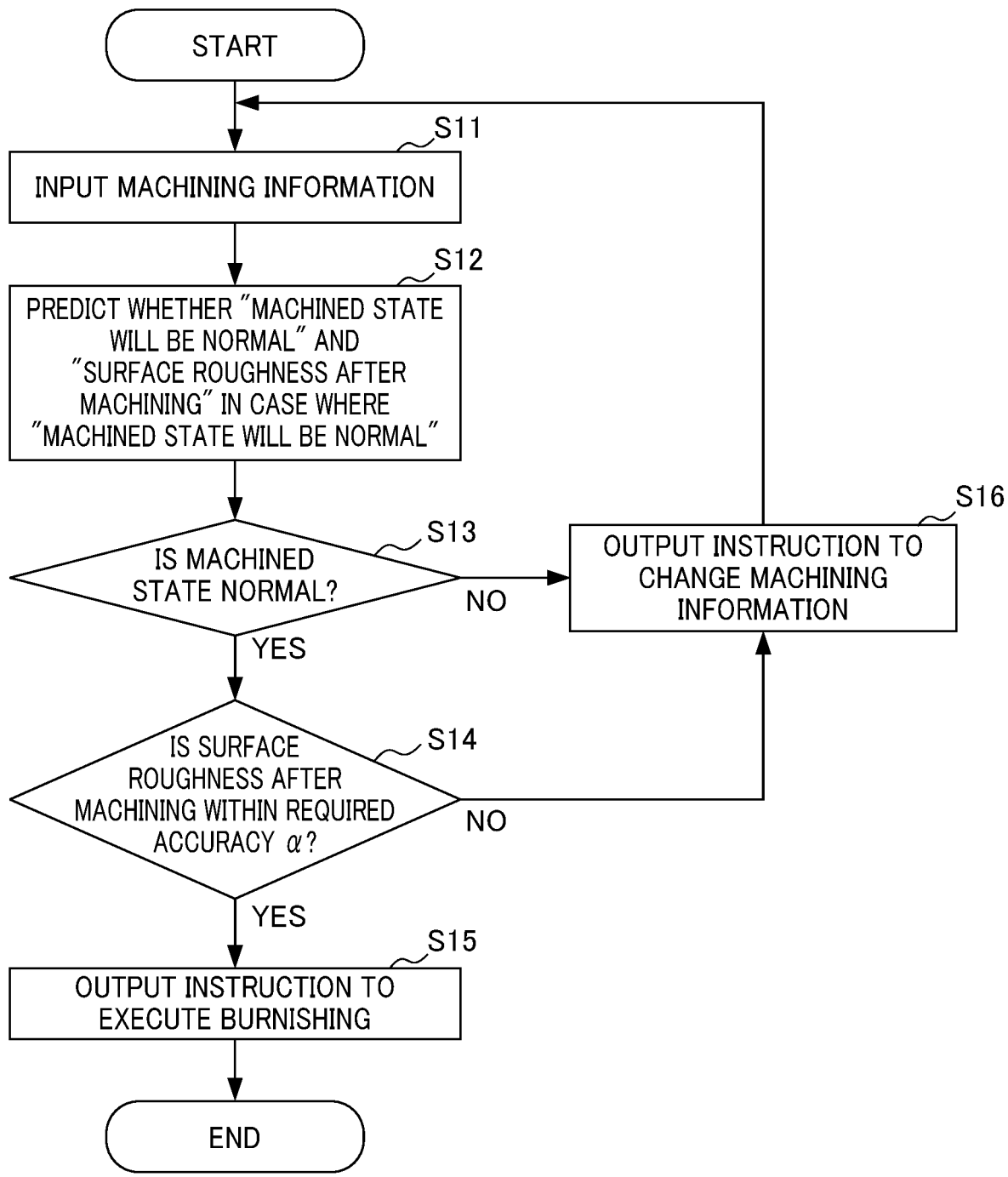
FIG. 5 is a flow chart for describing prediction processing by the machined state prediction device in an operation phase.

FIG. 5 is a flow chart for describing prediction processing by the machined state prediction device 20 in an operation phase. The flow illustrated here is repeatedly executed each time machining information is inputted.

In Step S11, before burnishing, the input unit 201 obtains from the machine tool 10 machining information that includes information on machining conditions for burnishing to be performed and information on a machining target workpiece.

In Step S12, the prediction unit 202 inputs the machining information inputted in Step S11 to the learned model 250 to thereby predict whether the "machined state will be normal" for the machining target workpiece, and the "surface roughness after machining".

In Step S13, the determination unit 203 determines whether the prediction made in Step S12 indicates that the "machined state will be normal". In the case where the "machined state will be normal", the processing proceeds to Step S14. In contrast, if it is not the case that the "machined state will be normal", the processing proceeds to Step S16.

In step S14, in the case where the "machined state will be normal" is determined in Step S13, the determination unit 203 compares the "surface roughness after machining" with a pre-set required accuracy α, and determines whether the "surface roughness after machining" is within the required accuracy α. If the "surface roughness after machining" is within the required accuracy α, the processing proceeds to Step S15. In contrast, in the case where the "surface roughness after machining" is not within the required accuracy α, the processing proceeds to Step S16.

In Step S15, the notification unit 204 outputs an instruction to execute burnishing based on the inputted machining information to an output device (not shown) in the machine tool 10 and/or the control device 101.

In step S16, the notification unit 204 outputs, to an output device (not shown) in the machine tool 10 and/or the control device 101, an instruction to change the machining information regarding, the burnishing to be performed. In this case, an operator of the machine tool 10 revises the machining conditions for the burnishing to be performed such that the "machined state will be normal" and the "surface roughness after machining" will be within the required accuracy α, and inputs the revised machining information to the machined state prediction device 20 (in other words, returns to the processing in Step S11).

By the above, the machined state prediction device 20 according to one embodiment, before burnishing, inputs to the learned model 250 machining information which includes information on machining conditions for burnishing to be performed and information on a machining target workpiece to thereby predict whether the machined state of the machining target workpiece after the burnishing to be performed will be normal and predict the surface roughness after machining.

As a result, the machined state prediction device 20 can predict the machined state of a workpiece after burnishing in a case where burnishing under designated machining conditions is performed, without actually carrying out or simulating burnishing.

Specifically, after the learned model is built, it becomes possible to easily predict, without carrying out burnishing or measuring a workpiece after burnishing, whether burnishing can be performed normally without waviness or deformation occurring and additionally what level of surface roughness will be achieved when burnishing is carried out under the machining conditions that are to be put into practice.

As a result, it is possible to resolve the time and effort for the trial and error of readjusting machining conditions for burnishing and carrying out burnishing again.

This concludes the description regarding one embodiment, but the machined state prediction device 20 and the machine learning device 30 are not limited to the embodiment described above, and include variations, improvements, etc. in a scope that enables the objective to be achieved.

<First Variation>

In the embodiment described above, the machine learning device 30 is exemplified as a device that differs to the machine tool 10, the control device 101, and the machined state prediction device 20, but some or all of the functionality of the machine learning device 30 may provided in the machine tool 10, the control device 101, or the machined state prediction device 20.

<Second Variation>

As another example, the machined state prediction device 20 is exemplified as a device that differs to the machine tool 10 or the control device 101 in the embodiment described above, but some or all of the functionality of the machined state prediction device 20 may be provided in the machine tool 10 or the control device 101.

Alternatively, one, some, or all of the input unit 201, the prediction unit 202, the determination unit 203, the notification unit 204, and the storage unit 205 in the machined state prediction device 20 may be provided in a server, for example. In addition, each function of the machined state prediction device 20 may be realized using, for example, a cloud-based virtual server function.

Furthermore, the machined state prediction device 20 may be a distributed processing system in which each function of the machined state prediction device 20 is distributed among a plurality of servers, as appropriate.

<Third Variation>

Figure 6:
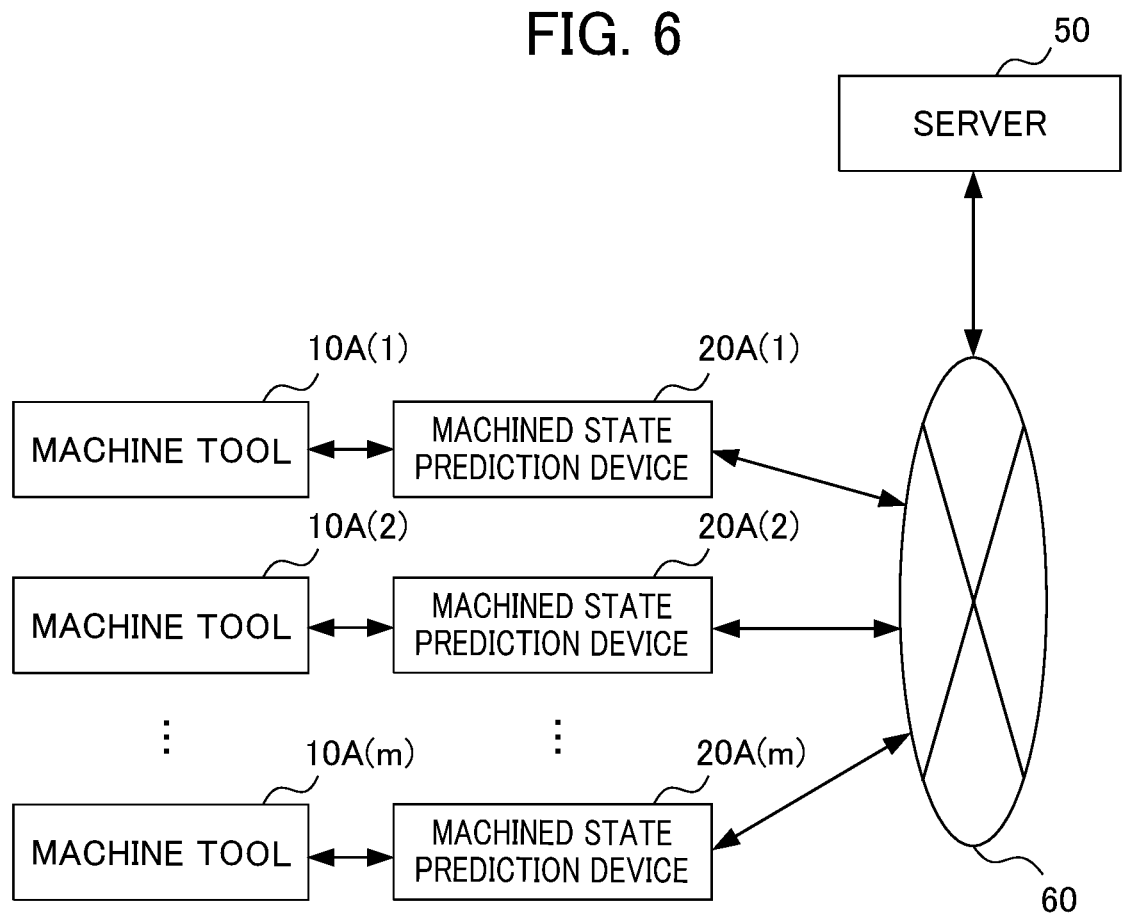
FIG. 6 is a view that illustrates an example of a configuration of a prediction system.

As another example, in the embodiment described above, the machined state prediction device 20 uses the learned model 250, which is provided from the machine learning device 30, is inputted with machining information regarding burnishing to be performed, and outputs machined state inform on for a workpiece in accordance with the burnishing to be performed, to thereby predict from the inputted machining information whether the "machined state will be normal" for a machining target workpiece in accordance with the burnishing to be performed and predict the "surface roughness after machining", but there is no limitation to this. For example, as illustrated in FIG. 6, a server 50 may store the learned model 250 generated by the machine learning device 30, and share the learned model 250 with m machined state prediction devices 20A(1) to 20A(m) connected to a network 60 (m is an integer equal to or greater than 2). As a result, it is possible to apply the learned model 250 even if a new machine tool and machined state prediction device are disposed.

Note that the machined state prediction devices 20A(1) to 20A(m) are respectively connected to machine tools 10A(1) to 10A(m).

In addition, each of the machine tools 10A(1) to 10A(m) corresponds to the machine tool 10 in FIG. 1. Each of the machined state prediction devices 20A(1) to 20A(m) corresponds to the machined state prediction device 20 in FIG. 1.

Figure 7:
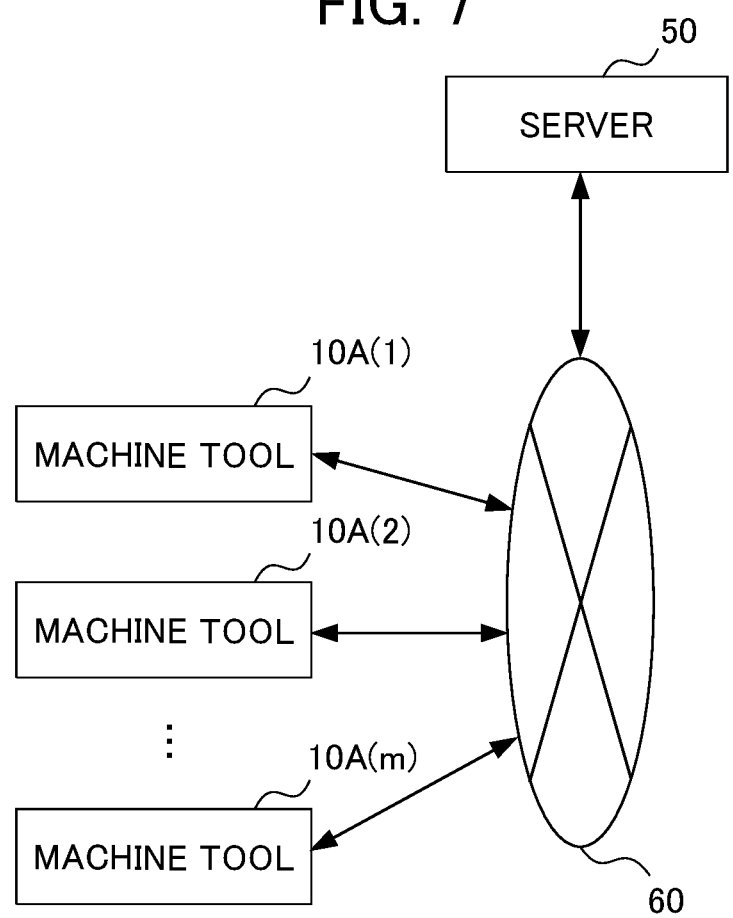
FIG. 7 is a view that illustrates an example of a configuration of a prediction system.

Alternatively, as illustrated in FIG. 7, a server 50 may, for example, operate as the machined state prediction device 20 and, for each of machine tools 10A(1) to 10A(m) connected to a network 60, predict from inputted machining information regarding burnishing to be performed machined state information regarding whether the "machined state will be normal" for a workpiece in accordance with the burnishing to be performed and predict the "surface roughness after machining". As a result, it is possible to apply the learned model 250 even it a new machine tool is disposed.

<Fourth Variation>

As another example, the machine learning device 30 executes supervised learning in the embodiment described above, but there is no limitation to this, and a learned model may be constructed by another learning method (for example, reinforcement learning that supplies a positive or negative reward).

Note that each function included in the machined state prediction device 20 and the machine learning device 30 according to the one embodiment may each be realized by hardware, software, or a combination of these. Being realized by software means being realized by a computer reading and executing a program.

Each component included in the machined state prediction device 20 and the machine learning device 30 may be realized hardware including an electronic circuit, etc., software, or a combination of hardware and software. In a case of being realized by software, a program that configures the software is installed onto a computer. Alternatively, these programs may stored onto removable media and distributed to a user, or may be distributed by being downloaded to a user's computer via a network. In addition, in the case of being configured by hardware, some or all or the functionality of each component included in the devices described above can be configured by an integrated circuit (IC) such as an application-specific integrated circuit (ASIC), a gate array, a field-programmable Gate array (FPGA), or a complex programmable logic device (CPLD), for example.

A program can be stored using various types of non-transitory computer-readable mediums and supplied to a computer. A non-transitory computer-readable medium includes various types of tangible storage mediums. An example of a non-transitory computer-readable medium includes a magnetic recording medium (for example, a floppy disk, magnetic tape, or a hard disk drive), a magneto-optical recording medium for example, a magneto-optical disk), a CD-ROM (read-only memory), CD-R, CD-R/W, and a semiconductor memory (for example, a mask ROM, a programmable ROM (PROM), an erasable PROM (EPROM), a flash ROM, or a RAM). In addition, a program may be supplied to a computer by various types of transitory computer-readable mediums. An example of a transitory computer-readable medium includes an electrical signal, an optical signal, or electromagnetic waves. A transitory computer-readable medium can supply a program to a computer via a wired communication channel such as an electrical wire or an optical fiber, or via a wireless communication channel.

Note that steps that express a program recorded to a recording medium of course include processing in chronological order following the order of these steps, but also include processing that is executed in parallel or individually, with no necessity for processing to be performed in chronological order.

To rephrase, the machine learning device, the machined state prediction device, and the control device according to the present disclosure can have various embodiments which have configurations such as the following.

(1) The machine learning device 30 according to the present disclosure is provided with the input data obtaining unit 301 which is configured to obtain, as input data, machining information for burnishing in which surface treatment was performed by pressing an arbitrary tool against a machined surface of an arbitrary workpiece, the machining information including at least information on the workpiece before the burnishing and information on a machining condition for the burnishing; the label obtaining unit 302 which is configured to obtain label data indicating machined state information including a machined state of the workpiece after the burnishing and a surface roughness of the workpiece in a case where the machined state is normal; and the learning unit 303 which is configured to use the input data obtained by the input data or unit 301 and the label data obtained by the label obtaining unit 302 to execute supervised learning and generate the learned model 250 that takes as an input machining, information regarding burnishing to be performed and outputs machined state information for the burnishing to be performed.

By virtue of this machine learning device 30, it is possible to generate the learned model 250 which outputs with good accuracy the machined state of a workpiece after machining in a case where burnishing under designated machining conditions is performed, without actually carrying out or simulating machining.

(2) The machine learning device 30 according to (1), in which it may be that the information on the workpiece includes at least one of material, hardness, thickness, and surface roughness before machining of the workpiece, and the information on the machining condition for the burnishing includes at least one of a relative rotation speed for between a tool and a workpiece, a relative feedrate for between the tool and the workpiece, and an amount of rolling compaction.

As a result, the machine learning device 30 can generate the learned model 250 which outputs machined state information that corresponds to the information on the workpiece and the information on the machining conditions.

(3) The machine learning device 30 according to (1) or (2), in which the machined state information, for the workpiece after the burnishing, may include at least one of whether a machined state indicating no waviness or deformation is normal and a surface roughness after machining in a case where the machined state is normal.

As a result, the machine learning device 30 can generate the learned model 250 which outputs with good accuracy the machined state information regarding the workpiece after machining that corresponds to the burnishing to be performed.

(4) The machined state prediction device 20 according to the present disclosure, provided with: the learned model 250 that is generated by the machine learning device 30 according to any one of (1) to (3) and is configured to be inputted with machining information regarding burnishing to be performed and output the machined state information for the burnishing to be performed; the input unit 201 which is configured to be inputted with, before burnishing, machining information that includes information on a machining condition for the burnishing to be performed and information on a machining target workpiece; and a prediction unit 202 which is configured to, by inputting to the learned model 250 the machining information inputted to the input unit 201, predict the machined state information that is for the burnishing to be performed and is to be outputted by the learned model 250.

By virtue of this machined state prediction device 20, it is possible to predict the machined state of a workpiece after machining in a case where burnishing under designated machining conditions is performed, without actually carrying out or simulating machining.

(5) The machined state prediction device 20 according to (4), in which it may be that the information on the workpiece includes at least one of material, hardness, thickness, and surface roughness before machining of the workpiece, and the information on the machining condition for the burnishing includes at least one of a relative rotation speed for between a tool and a workpiece, a relative feedrate for between the tool and the workpiece, and an amount of rolling compaction.

As a result, the machined state prediction device 20 can predict machined state information that corresponds to the information on the workpiece before machining and the information on machining conditions for the burnishing.

(6) The machined state prediction device 20 according to (4) or (5), in which the machined state information, for the machining target workpiece after the burnishing to be performed, may include at least one of whether a machined state indicating no waviness or deformation is normal and a surface roughness after machining in a case where the machined state is normal.

As a result, the machined state prediction device 20 can predict with good accuracy the machined state information regarding a workpiece after machining that corresponds to the burnishing to be performed.

(7) The machined state prediction device 20 according to (6) may be provided with: the determination unit 203 which is configured to compare the surface roughness after machining, predicted by the prediction unit 202 with the pre-set required accuracy α, and determine whether the surface roughness after machining is within the required accuracy α.

As a result, the machined state prediction device 20 can prompt an operator of the machine tool 10 to revise the machining conditions for the burnishing to be performed, such that the machined state will be normal and the surface roughness after machining will be within the required accuracy α.

(8) The machined state prediction device 20 according to any one of (4) to (7), wherein the learned model 250 may be stored in the server 50 that is connected so as to be accessible from the machined state prediction device 20 via the network 60.

As a result, the machined state prediction device 20 can apply the learned model 250 even if a new machine tool 10, control device 101, and machined state prediction device 20 are disposed.

(9) The machined state prediction device 20 according to any one of (4) to (8) may be provided with: the machine learning device 30 according to any one of (1) to (3).

As a result, the machined state prediction device 20 can achieve an effect similar to that for any one of (1) to (8) described above.

(10) The control device 101 according to the present disclosure is provided with the machined state prediction device 20 according to any one of (4) to (9).

By virtue of this control device 101, it is possible to achieve effects similar to any one of (4) to (9) described above.

EXPLANATION OF REFERENCE NUMERALS

10 Machine tool
101 Control device
20 Machined state prediction device
201 Input unit
202 Prediction unit
203 Determination unit
204 Notification unit
205 Storage unit
250 Learned model
30 Machine learning device
301 input data obtaining unit
302 Label obtaining unit
303 Learning unit
304 Storage unit
50 Server
60 Network

The invention claimed is:

1. A machine learning device, comprising:
a non-transitory memory configured to store a program;
a processor configured to execute the program stored on the memory to cause the machine learning device to:
obtain, as input data, machining information for burnishing in which surface treatment was performed by pressing an arbitrary tool against a machined surface of a workpiece, wherein the machining information including at least information on the workpiece before the burnishing and information on a machining condition for the burnishing;
obtain label data indicating machined state information including a machined state of the workpiece after the burnishing and a surface roughness of the workpiece in a case where the machined state is normal; and
use the obtained input data and the obtained label data to execute supervised learning and generate a learned model that takes as an input machining information regarding burnishing to be performed and outputs machined state information for the burnishing to be performed, wherein the information on the workpiece before the burnishing includes surface roughness before machining of the workpiece, the machined state information includes a surface roughness after machining in the case where the machined state is normal, the machined state information outputted by the learned model is utilized to output an instruction to execute burnishing or an instruction to change the machining information, and further the machined state information outputted by the learned model is utilized to generate an operational command which are utilized by a machine tool to execute burnishing on the machining target workpiece.

2. The machine learning device according to claim 1, wherein the information on the workpiece includes at least one of material, hardness, thickness, and surface roughness before machining of the workpiece, and the information on the machining condition for the burnishing includes at least one of a relative rotation speed for between a tool and a workpiece, a relative feedrate for between the tool and the workpiece, and an amount of rolling compaction.

3. The machine learning device according to claim 1, wherein the machined state information, for the workpiece after the burnishing, includes at least one of whether a machined state indicating no waviness or deformation is normal and a surface roughness after machining in the case where the machined state is normal.

4. A machined state prediction device, comprising:
a non-transitory memory configured to store a program;
a processor configured to execute the program stored on the memory to cause the machined state prediction device to:
perform the machined state prediction using a learned model that is generated by the machine learning device according to claim 1 and is configured to be inputted with machining information regarding burnishing to be performed and output the machined state information for the burnishing to be performed;
obtain from a machine tool, before burnishing, machining information that includes information on a machining condition for the burnishing to be performed and information on a machining target workpiece;
by inputting to the learned model the obtained machining information, predict the machined state information that is for the burnishing to be performed and is to be outputted by the learned model, and
in a case where the machined state will be normal, determine whether the surface roughness after machining is within the required accuracy.

5. The machined state prediction device according to claim 4, wherein the information on the machining target workpiece includes at least one of material, hardness, thickness, and surface roughness before machining of the workpiece, and the information on the machining condition for the burnishing includes at least one of a relative rotation speed for between a tool and a workpiece, a relative feedrate for between the tool and the workpiece, and an amount of rolling compaction.

6. The machined state prediction device according to claim 4, wherein the machined state information, for the machining target workpiece after the burnishing to be performed, includes at least one of whether a machined state indicating no waviness or deformation is normal and a surface roughness after machining in a case where the machined state is normal.

7. The machined state prediction device according to claim 6, wherein the processor is further configured to execute the program to further cause the machined state prediction device to: compare the predicted surface roughness after machining with a pre-set required accuracy, and determine whether the surface roughness after machining is within the required accuracy.

8. The machined state prediction device according to claim 4, wherein the learned model is stored in a server that is connected so as to be accessible from the machined state prediction device via a network.

9. A machined state prediction device comprising:
the machine learning device according to claim 1;
a non-transitory memory configured to store a program;
a processor configured to execute the program stored on the memory to cause the machined state prediction device to:
perform the machined state prediction using the learned model that is generated by the machine learning device and is configured to be inputted with machining information regarding burnishing to be performed and output the machined state information for the burnishing to be performed;
obtain from a machine tool, before burnishing, machining information that includes information on a machining condition for the burnishing to be performed and information on a machining target workpiece;
by inputting to the learned model the obtained machining information, predict the machined state information that is for the burnishing to be performed and is to be outputted by the learned model, and
in a case where the machined state will be normal, determine whether the surface roughness after machining is within the required accuracy.

10. A control device comprising: the machined state prediction device according to claim 4.

* * * * *